United States Patent [19]

Flowers et al.

[11] 4,131,664
[45] Dec. 26, 1978

[54] METHOD OF MAKING A MULTIPLE-DENSITY FIBROUS ACOUSTICAL PANEL

[75] Inventors: Thomas A. Flowers, Royal Oak; Anthony W. Marra, Sterling Heights; Samuel D. Vinch, Detroit, all of Mich.

[73] Assignee: Allen Industries, Inc., Troy, Mich.

[21] Appl. No.: 837,313

[22] Filed: Sep. 28, 1977

[51] Int. Cl.$^2$ .......................... B29C 17/04; B32B 1/10
[52] U.S. Cl. ..................... 264/510; 156/285; 264/113; 264/118; 264/119; 428/218
[58] Field of Search ............... 264/89, 90, 91, 92, 264/93, 113, 118, 119; 156/285; 428/218

[56] References Cited

U.S. PATENT DOCUMENTS

| | | | |
|---|---|---|---|
| 2,150,458 | 3/1939 | Randall | 428/163 X |
| 2,851,730 | 9/1958 | Willhelmi et al. | 264/113 |
| 2,890,146 | 6/1959 | Unsworth | 428/218 X |
| 3,825,642 | 7/1974 | Kies | 264/90 |
| 3,895,089 | 7/1975 | Goyal | 264/113 X |

FOREIGN PATENT DOCUMENTS 935961  9/1963  United Kingdom ............ 156/285

Primary Examiner—Jan H. Silbaugh
Attorney, Agent, or Firm—Harness, Dickey & Pierce

[57] ABSTRACT

An improved acoustical and trim acoustical panel suitable for use in the interior passenger compartments and exterior components of automotive vehicles or the like, comprising a plurality of fibrous layers of controlled different density, integrally united together at their interfaces and optionally provided with a decorative finish on one or both outer face surfaces thereof. The invention is further directed to novel methods for making such trim panels incorporating preselected contours and localized embossments therein to conform to the contour of the structural panels of vehicle bodies over which the trim panels are adapted to be mounted. In accordance with one process embodiment, a fibrous pad is formed incorporating suitable binding agents and a coextensive impervious membrane or film disposed intermediate of the face surfaces thereof. The composite pad is placed in an appropriately contoured mold and pneumatic pressure is applied to one side thereof to effect a densification and molding of the stratum of fibers disposed between the membrane and the mold surface without appreciably compacting the opposite fibrous layer, while simultaneously setting the binding agent to form a contoured shape-retaining pad having a dual-density fibrous structure.

18 Claims, 13 Drawing Figures

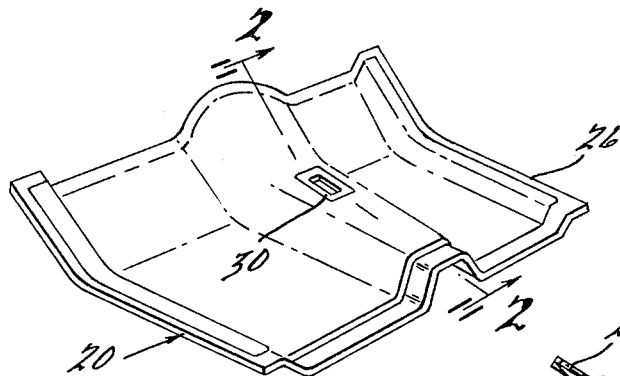
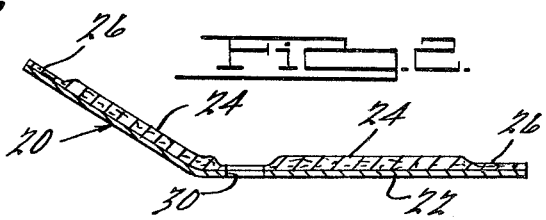
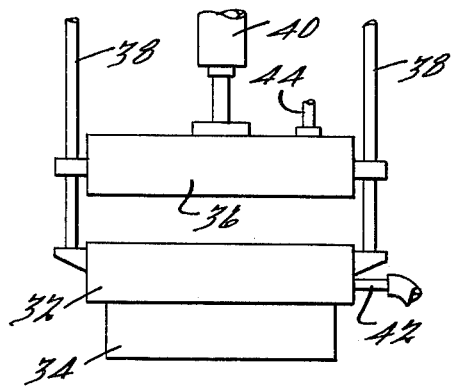
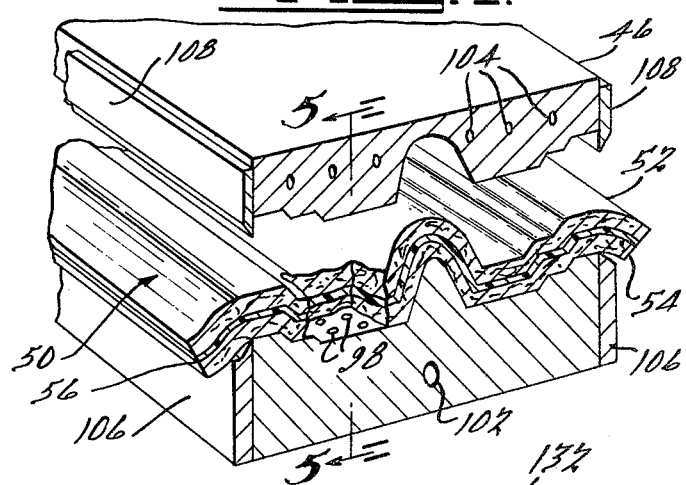
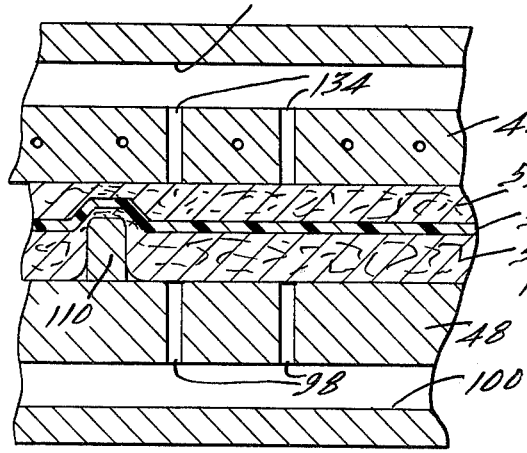
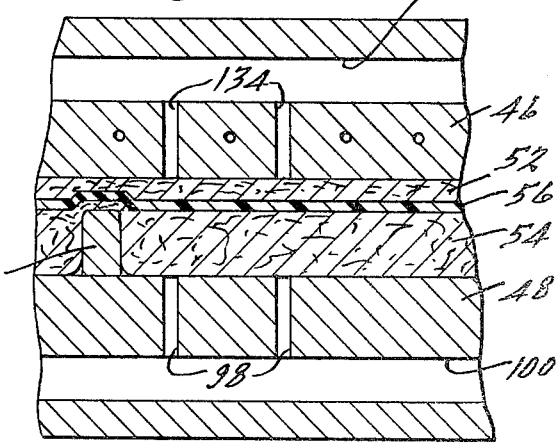

METHOD OF MAKING A MULTIPLE-DENSITY FIBROUS ACOUSTICAL PANEL

BACKGROUND OF THE INVENTION

A variety of materials and structural arrangements, as well as processing techniques for their manufacture, have heretofore been used or proposed for use for producing acoustical and trim acoustical panels of a type adapted to be installed against the interior surfaces of structural panels, defining the passenger compartment of automotive vehicles or the like. Such panels have been effective in reducing the transmission of engine and road noise into the passenger compartment and in some instances, have also been employed to further enhance the aesthetic decor of the passenger compartment by the application of suitable finishes to the exposed face of the panel. The important considerations heretofore associated in the manufacture and use of such panels has been the cost of the material itself, the cost of its manufacture and the ease by which such panels can be installed at selected locations adjacent to the structural panels defining the vehicle body. A further important consideration has been the acoustical property of such panels and their durability over prolonged service during which they are subjected to wide variations in ambient conditions.

Composite, contoured sound insulating panels which have been commercially acceptable typically comprise a fibrous pad having a dense filled resinous or asphaltic coating applied substantially uniformly on at least one face surface thereof. Prior art processes typically employed for manufacturing such composite sound insulating panels are disclosed in U.S. Pat. Nos. 3,429,728; 3,536,557 and 4,035,215. In accordance with the foregoing patented processes, fibrous panels are molded to impart a preselected shape-sustaining contour thereto and are coated with a dense sound insulating substance, such as a highly filled asphaltic or bituminous base material, or alternatively, a highly filled thermoplastic resinous material such as a plastisol, for example. The composite structure of such panels has contributed to a significant reduction in the noise level of passenger compartments of automotive vehicles.

The energy crisis has prompted an increased emphasis on the manufacture of more fuel efficient automobiles and reductions in the size and weight are important considerations in attaining this goal. In the selection of lighter weight materials and structural components to achieve a reduction in the weight of the vehicle, careful consideration has been given to the maintenance of passenger safety and comfort. There, accordingly, has developed a need for an improved acoustical and trim acoustical panel which is of lighter weight, but which nevertheless provides for satisfactory sound and thermal insulating characteristics, which is of economical manufacture, which is simple to install and which provides for versatility in its use at selected locations in automobile bodies or the like.

The present invention provides for an improved acoustical trim panel as well as for novel methods of producing such trim panels on a commercial scale at economical cost, whereby sound insulating characteristics are retained at a substantial reduction in weight of such panels.

SUMMARY OF THE INVENTION

The benefits and advantages of the present invention are achieved by a fibrous panel possessed of acoustical properties and comprising a plurality of fibrous layers, each of a controlled different density disposed in substantially coextensive overlying relationship and integrally united to each other at the interface therebetween. Each of the fibrous layers is comprised of a fibrous mass of substantially uniform density and thickness over the major area thereof and a suitable binding agent of a thermosetting or a thermoplastic type, as well as mixtures thereof, present in amounts ranging from as low as about 10% up to about 45% by weight based on the total weight of the fibrous layer. The panel may further incorporate local embossments characterized by areas in which all of the fibrous layers are densified so as to provide for further rigidification of the panel as well as to conform to the surface contour of the structural panels over which the panel is adapted to be installed. The panel may further include one or more films interposed between the exposed face surfaces of the panel positioned at selected areas as well as extending coextensively of the periphery of the panel itself to further enhance the acoustical characteristics thereof.

In accordance with the method aspects of the present invention, the plural density acoustical panel is made in accordance with one of the process embodiments by first forming a composite fibrous pad containing a flexible film or membrane interposed between a first fibrous layer and a second fibrous layer disposed in overlying relationship. Each of the fibrous layers are initially of substantially uniform thickness and density and incorporate a suitable binding agent distributed therethrough. The composite fibrous pad is thereafter subjected to a molding operation whereby the pad is positioned in overlying relationship with respect to a mold having a preselected contoured mold surface and a pneumatic pressure is applied through the opposite fibrous layer against the flexible film or membrane at a pressure sufficient to effect a compaction of the fibrous layer disposed between the film and the mold surface to a desired density and in intimate contact with the mold surface without effecting any appreciable densification of the opposite fibrous layer. While under the pressurized condition, the binding agents in the fibrous pad are set or cured so as to retain the densified fibrous layer, as well as the nondensified fibrous layer in the appropriately contoured and densified condition. Thereafter, the pressure is released and the panel is extracted from the mold.

In accordance with an alternative process of the present invention, each of the individual fibrous layers are separately molded between contoured mold surfaces to the desired density and configuration. The opposed surfaces of the individual layers are thereafter coated with a suitable adhesive and the layers are assembled in superimposed overlying relationship and are subjected to a final molding operation between matched pairs of mold surfaces, forming an integral acoustical panel comprised of a plurality of fibrous layers of controlled different densities.

In accordance with still another alternative method of the present invention, a contoured multi-layered panel is produced by first molding a lower density fibrous pad to a desired preselected contoured configuration and forming a second fibrous pad incorporating a thermoplastic binder therein in the form of a flat, high density layer. The high density pad is preheated to a temperature to effect a heat softening of the thermoplastic binder therein, whereafter the heat softened high density layer is superimposed over the precontoured low density layer, with a suitable bonding agent interposed therebetween, and the assembly is subjected to a final molding operation in which the heat softened high density layer is cooled to a temperature below that at which a rigidification of the thermoplastic binding agent occurs and a setting of the adhesive is effected, producing a shape-retaining dual-density composite fibrous acoustical panel.

Additional benefits and advantages of the present invention will become apparent upon a reading of the description of the preferred embodiments, taken in conjunction with the accompanying drawings.

BRIEF DESCRIPTION OF THE DRAWINGS

FIG. 1 is a perspective view of a typical fibrous panel assembly of a type to which the present invention is applicable;

FIG. 2 is a fragmentary transverse sectional view through the panel shown in FIG. 1 and taken substantially along the line 2—2 thereof;

FIG. 3 is a fragmentary and partially schematic side elevational view of a typical press arrangement for molding the fibrous panels of the present invention;

FIG. 4 is a fragmentary perspective view, partly in section, illustrating the disposition of a composite fibrous pad positioned on one mold surface preliminary to closing of the upper mold;

FIG. 5 is a fragmentary magnified elevational view of the composite fibrous pad interposed between the closed mold surfaces of FIG. 3 prior to application of fluid pressure to an impervious film interposed between the face surfaces of the pad;

FIG. 6 is a fragmentary magnified sectional view similar to FIG. 5 illustrating the disposition of the fibrous pad after the application of a controlled pneumatic pressure against the underside of the impervious film;

DESCRIPTION OF THE PREFERRED EMBODIMENTS

Figure 7:
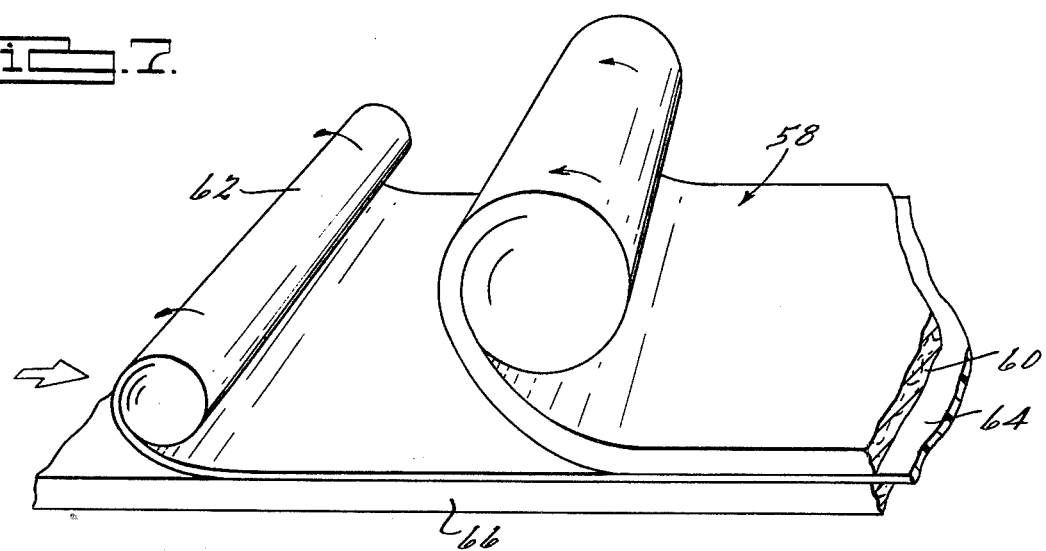
FIG. 7 is a fragmentary perspective view of one technique for forming a composite fibrous pad for molding in accordance with the procedure depicted in FIGS. 3–6.

Referring now in detail to the drawings, a typical multiple-layered fibrous acoustical panel of the type to which the present invention is applicable is illustrated in FIG. 1. As shown, the panel 20 is possessed of a compound curvature of any desired configuration conventionally corresponding to the curvature of the structural floor panel of an automobile body over which the acoustical panel is adapted to be installed. As may be best seen in the magnified cross sectional view comprising FIG. 2, the panel 20 includes a first or densified fibrous layer 22 and a second fibrous layer of lower density indicated at 24, which are integrally united together at the interface therebetween. In the specific embodiment shown, the acoustical panel includes a compacted densified peripheral edge portion 26 extending therearound to facilitate attachment of the panel and can further include a densified strip or rib over localized areas thereof for the purpose of imparting further rigidity to the panel, as well as for providing clearance or accommodating structural stringers on the surface of the panel over which the acoustical panel is to be secured. Additionally, the trim panel 20 can be provided with one or more cut-out sections or apertures 30, as may be desired or required, through which structural components of the vehicle body project. The aperture 30 conventionally is cut through the panel upon completion of the molding thereof. In addition to apertures 30, the panel can be provided with suitable slits, perforations, etc., at selected locations to accommodate control and operating linkages.

While the specific embodiment illustrated in FIGS. 1 and 2 illustrate an acoustical panel comprised of two fibrous layers of different density, it will be appreciated that the present invention is also applicable for the fabrication of acoustical and trim acoustical panels comprising three or more fibrous layers to achieve the desired acoustical properties. The high density layer 22 conventionally is positioned outwardly of the vehicle structural panel and may be desirably provided with a suitable decorative coating or texture to conform with the decor of the vehicle interior trim.

The formation of the acoustical panel in accordance with the method aspects of the present invention conventionally employs a press arrangement, such as shown in FIG. 3, comprising a lower platen 32, which is stationarily supported on a base 34 and a movable upper platen 36, guidably supported on guide rods 38 and reciprocable therealong by a double-acting fluid-actuated cylinder 40. The lower platen 32 can be provided with an inlet tube 42 for introducing a suitable heating or cooling fluid thereto and similarly, the upper platen can be provided with a conduit 44 for introducing a heating or cooling medium thereto, depending upon the specific manner in which a molding of the fibrous panel is effected.

Appropriately contoured mold or die sections, such as an upper mold 46, as shown in FIG. 4, and a lower mold 48, are adapted to be secured to the opposed face surfaces of the upper platen and lower platen, respectively. A composite fibrous pad 50, as shown in FIG. 4, is placed between the contoured upper and lower mold surfaces and is molded to the appropriate contoured configuration of the mold surfaces in accordance with one embodiment of the present invention by the application of pneumatic pressure to the underside of the pad, effecting a densification of the upper fibrous layer.

Figure 8:
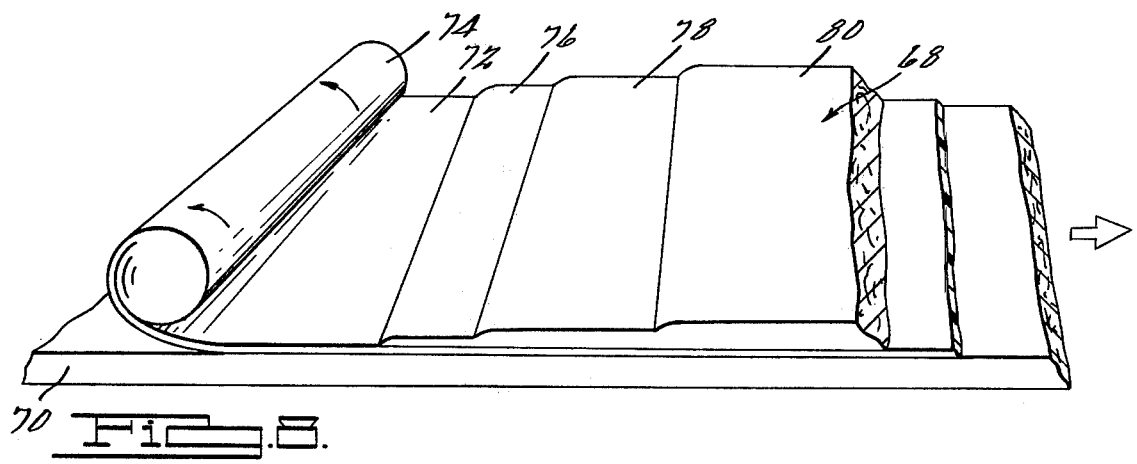
FIG. 8 is an alternative technique for producing a composite fibrous pad incorporating an impervious film interposed between the face surfaces thereof.
Figure 9:
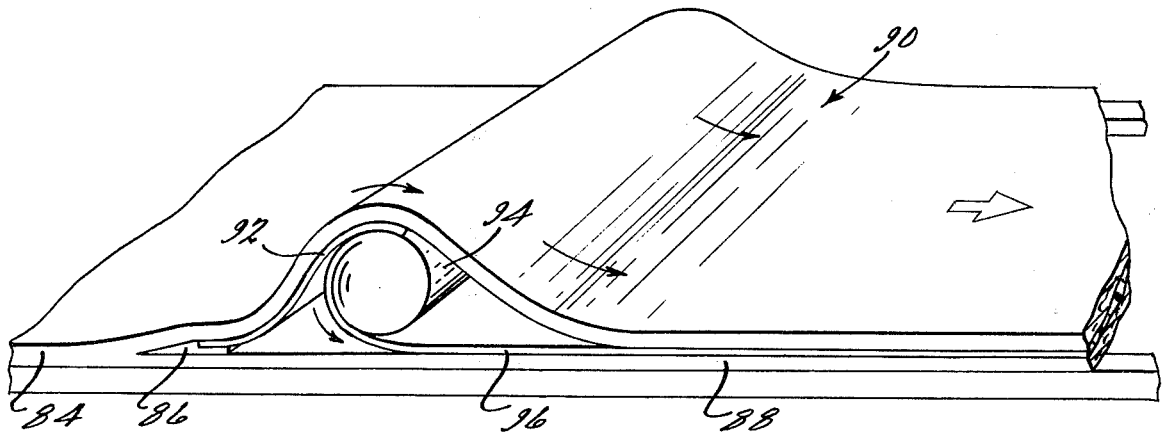
FIG. 9 is still another alternative method for forming a composite fibrous pad incorporating an impervious film therethrough.

In the specific arrangement shown in FIG. 4, the fibrous pad 50 comprises an upper or first layer 52, a lower or second layer 54 and a gas impervious flexible film or membrane 56 interposed between the opposed face surfaces of the upper and lower fibrous layers at a point intermediate the outer faces thereof. The formation of composite fibrous pads of the foregoing type can be achieved by a hand lay-up operation or, alternatively, by either one of the techniques as schematically illustrated in FIGS. 7–9 of the drawings.

As shown in FIG. 7, a composite fibrous pad or blanket 58 is produced in accordance with one embodiment by preliminarily forming an upper fibrous layer 60 which is stored in the form of roll stock and providing a roll 62 of a flexible film 64. The upper fibrous layer 60 and film 64 are advantageously applied in superimposed relationship over a lower fibrous layer 66 as it is advanced toward the right as viewed in FIG. 7 upon exiting from a suitable garnetting or air-laying apparatus in which the lower fibrous layer is formed.

The upper and lower fibrous layers are comprised of a mass of randomly arranged fibers which may be comprised of any one or mixtures of the types well known in the art, including those of animal, vegetable and synthetic origin. Preferably, fibers are selected which are of a length and strength and possessed of inherent flexibility to enable the formation of a fibrous network which is porous and possesses resiliency. Additionally, the mechanical properties of the fiber are preferably such to enable them to be passed through a garnetting or carding machine so as to effect a combing and random orientation thereof into an elongated fibrous blanket or batt without incurring any appreciable breakage or disintegration of the fibrous filaments. Fibers which possess mechanical properties of the foregoing type include naturally-occurring vegetable origin fibers, such as cotton, hemp, jute, ramie, sisal, cellulose, abaca, or the like. Typical naturally-occurring animal origin fibers include wool, silk; hair from cattle, horses and hogs; chicken feathers, etc,; while fibers of a synthetic origin include cellulose acetate, viscose rayon, nylon, vinyl chloride, protein base fibers such as casein and soybean; glass fibers, ceramic fibers, or the like. In addition to the foregoing mechanical properties, the selection of the fibers or fibrous mixture is also made in consideration of their resistance to thermal degradation at the elevated temperatures to which they are to be subjected during the formation of the individual fibrous layers, as well as during the molding operation.

Each of the fibrous layers are formed of a substantially uniform desired thickness and density throughout by employing any one of a variety of techniques well known in the art. For example, the fibrous layers can be produced by passing the fibers or fibrous mixture through a suitable garnetting or carding machine so as to form a web which thereafter passes through a lapper in which an overlapping of the web is performed until a batt or blanket of the desired thickness is obtained. Alternatively, the fibrous blanket can be produced by any one of the well known air-laying techniques in which the individual fibers are deposited from an airborne condition on a movable drum or foraminous belt to achieve the desired thickness and density. Regardless of the specific manner in which the fibrous layers are initially formed, the formation procedure is carried out so as to introduce a suitable binding agent in a finely particulated or powdered form into the matrix of the fibrous mass, which upon subsequent setting in a manner as subsequently to be described serves to integrally bond the fibrous mass together and to further retain the molded fibrous layers in an appropriately densified and contoured condition.

The initial thickness and density of each fibrous layer can be varied consistent with the desired acoustical panel to be produced. Ordinarily, fibrous blankets can be produced of a thickness as low as about ¼ inch up to about 2½ inches or greater, while thicknesses ranging from about ¾ inch to about 1½ inches are usually preferred. The foregoing thicknesses when forming a fibrous pad comprised of two such layers, provides an initial pad broadly ranging from about ½ up to about 5 inches, and preferably, 1½ to 3 inches in total thickness. The weight of the composite fibrous pad comprising the plural fibrous layers and film interposed therebetween may broadly range from as low as about 50 to as high as 500 grams per square foot, while weights including the binding agent incorporated therein of from about 100 grams to about 200 grams per square foot are usually preferred. While the thickness and weight of the preliminarily formed upper fibrous layer 60 and lower fibrous layer 66, as shown in FIG. 7, are usually substantially the same, it will be appreciated that both the thickness and initial weight thereof can be varied to provide a final thermal and acoustical insulating or a trim acoustical panel of the desired structure. The flexible film 64, accordingly, can be interposed between the opposed face surfaces of the upper and lower layer at any position intermediate of the outer face surfaces of the layers and normally is spaced inwardly at least ⅛ inch from the adjacent outer fibrous layered surface.

The plural density panel produced starting with a composite fibrous pad of a thickness and weight as previously described or utilizing individually molded layers in accordance with the alternative method aspects hereinafter to be described is characterized as comprising at least one densified layer integrally bonded to a second less dense layer. The densified layer in accordance with the present invention is of a density ranging from about 0.2 grams per cubic centimeter (12.5 pounds per cubic foot) to a density as high as about 1.3 gm/cc (81 lb/ft$^3$), while densities of about 0.4 (25 lb/ft$^3$) to about 1 gm/cc (62.5 lb/ft$^3$) are particularly preferred. The less dense layer, on the other hand, may range from a density as low as about 0.04 gm/cc (2.5 lb/ft$^3$) to as high as about 0.2 gm/cc (12.4 lb/ft$^3$), while densities of about 0.07 gm/cc (4.4 lb/ft$^3$) to about 0.11 gm/cc (6.8 lb/ft$^3$) are particularly satisfactory. The maximum density of the densified layer is that established by the fibrous material and binder agents employed, which are compacted to 100% of theoretical density. More usually, the densified layer is densified up to about 90% of theoretical density.

In order to achieve optimum thermal and acoustical insulating characteristics, it has been found that the ratio of density of the dense layer to the less dense layer may broadly range from about 2:1 up to about 32:1, while a density ratio of from about 4:1 to about 15:1 is preferred in that it provides for ease of processing of the panel and good acoustical and thermal insulating properties. At density ratios in excess of about 32:1, difficulties are encountered in the processing of the panel.

The foregoing density and density ratio limits are also applicable to plural density panels comprised of three or more individual layers. Usually, it is preferred that the dense layers are on the outside of the panel, with the less dense layers disposed therebetween. It is also preferred when more than two layers are employed, that the layers alternate from high density to low density to high density, etc., on passing from one face to the opposite face of the panel.

The specific type and quanity of binding agents incorporated in each of the fibrous layers can be varied consistent with the method by which the plural density panel is molded. Conventionally, powdered binding agents are introduced so as to effect a substantially uniform impregnation of the fibrous matrix and are employed in amounts ranging from as low as about 10% up to about 45% by weight based on the total weight of the fibrous layer. The use of higher concentrations of binding agent provides for greater rigidity of the resultant contoured panel. For most situations, satisfactory results are obtained when the binding agent is employed in an amout of from about 18% up to about 35% by weight of the fibrous layer.

In accordance with one embodiment of the present invention, in which pneumatic pressure is employed for effecting a molding and densification of one of the fibrous layers, the binding agent comprises a thermosetting resin of any of the types known in the art, including phenol aldehyde resins, urea resins, melamine resins or the like, of which the condensation product of phenol with formaldehyde constitutes a preferred material. Additionally, various lattices, either of natural or synthetic rubber, as well as synthetic resin lattices, such as urethane or the like, can also be satisfactorily employed for this purpose. When lattices are employed, they are conventionally spray-applied in liquid form to the fibrous web during the formation of the fibrous layer or blanket.

In accordance with alternative embodiments of the method of making the acoustical and trim acoustical panel, the binding agent may comprise any one of a variety of thermoplastic heat softenable resins which are characterized as being compatible with the fibrous structure and have a heat softening range generally ranging from about 200° F. up to a temperature below that at which a thermal degradation of the fibers occur. Preferably, such thermoplastic resins are of a heat softening range within about 250° F. to about 300° F. Of the variety of thermoplastic resins suitable for use in accordance with the practice of the present invention, polyethylene, polystyrene, polypropylene, acrylic, polyvinyl acetate, polyvinyl chloride resins, polyvinyl chloride copolymers, or the like, can be satisfactorily used, of which polyvinyl chloride itself constitutes a preferred thermoplastic binder. A polyvinyl resin binding agent in powder form which has been found particularly satisfactory is commercially available from Union Carbide Corporation under the designation VYHH, and comprises a copolymer of vinyl acetate and vinyl chloride. As in the case of the thermosetting binding agent, the thermosetting resin binder in powder form can be uniformly distributed in the fibrous matrix upon emergence from the garnetting machine during its passage toward the lapper or alternatively, during the air-laying operation, whereby a uniform dusting of the web or batt structure is effected.

It is also contemplated that the binding agent employed can comprise a blend of a thermosetting as well as thermoplastic binder of the aforementioned types to provide additional benefits in the handling of the fibrous batts prior to and during the final molding operation.

According to one practice of the present invention, the thermoplastic resin is employed in an amount ranging from about 15% to about 95%, preferably about 50% up to about 75% by weight of the total binder content, with the balance comprising a thermosetting binding agent present in amount sufficient to integrally bond the fibrous matrix together so as to retain its integrity during the handling of the fibrous pad preliminary to the molding operation. In the preliminary formation of the fibrous layers, it is usually preferred to subject the outer face surfaces thereof to a treatment, such as by the application of heat to effect a partial curing of the thermosetting binding agent or a heat softening of the thermoplastic binding agent in the surface stratum thereof so as to impart additional integrity to the layers, facilitating subsequent handling thereof and the formation of a composite fibrous pad in a manner such as shown in FIG. 7.

The film 64 employed in forming the composite pad may be comprised of any one of a variety of materials which are of sufficient strength, heat resistance and flexibility to effect a pressure molding of the fibrous pad into a trim panel in a manner as subsequently to be described. For example, the film may be comprised of a polyolefin resin, such as polyethylene or polypropylene, acrylonitrile-butadiene-styrene (ABS), vinyl resins, vinylidene resins and copolymers thereof, or the like. The film itself need not be thermoplastic and should be of sufficient heat stability to prevent disintegration during the pressure molding operation until at least a partial setting of the binding agents is effected to retain the contoured densified pad in the molded condition. Thereafter, the film can disintegrate and become diffused into the molded fibrous matrix.

Depending upon the specific material employed, the film itself may range in thickness from about ½ mil (0.0005 inch) up to about 25 mils (0.025 inch), with thicknesses of from about 1 to 5 mils generally being preferred. As the film is increased in thickness beyond about 25 mils, it generally becomes less flexible and thicknesses of the foregoing magnitude are more expensive and ordinarily are not economically justified over the use of thinner gauge films. Of the various materials suitable for use, polyolefin polymeric films of a thermoplastic nature are conventionally preferred.

In the embodiment illustrated in FIG. 7, the film 64 is interposed between the upper and lower fibrous layers and is substantially coextensive therewith. It is also contemplated that the film can be interposed only at localized positions consistent with the intended structural features of the multi-layered acoustical panel to be produced. It is also contemplated that in addition to the impervious film 64, additional films of a perforate character; that is, pervious as a result of the application of perforations or slits therethrough, can be employed at positions upstream from the pressure side of the fibrous pad to impart further structural features and acoustical properties to the resultant molded panel. In any event, the surfaces of the film employed can be provided with a suitable pretreatment to enhance the bondability of the film to the opposed face surfaces of the fibrous layers. In this connection, a suitable adhesive layer applied to the film surface or to the fibrous layer can be used or, alternatively, the powdered binding agent within the fibrous layers themselves can be adjusted to provide the requisite adhesion.

Referring now to FIG. 8 of the drawings, an alternative technique for forming a composite fibrous pad 68 is illustrated in which a lower fibrous layer 70 is advanced toward the right, as viewed in FIG. 8, as it emerges from a garnetting/lapper apparatus or an air-laying apparatus and an impervious film 72, supplied in the form of a roll 74, is applied over the upper surface thereof. Thereafter, the lower layer 70 and film 72 passes beneath a lapper device in which a series of laps 76, 78, 80 in the form of a fibrous web from a lapper is applied to provide the requisite thickness forming, in situ, an upper fibrous layer 82.

Still another alternative method for forming the fibrous pad is illustrated in FIG. 9, in which a fibrous web 84 is integrally formed and is advanced toward the right as viewed in FIG. 9 while supported on a suitable conveyor or tenter frame. A slitter knife or blade 86 is provided effecting a slitting of the fibrous web 84 into a lower fibrous layer 88 and an upper fibrous layer 90. The upper fibrous layer 90 passes over an arcuate shoe 92 beneath which a roll 94 containing a suitable impervious film 96 is positioned and which is applied in overlying relationship against the opposed slit surfaces of the lower and upper fibrous layers.

Regardless of the particular manner by which the composite fibrous pad is produced, a molding thereof into a multiple-layered fibrous acoustical panel is effected in accordance with the arrangement as best shown in FIGS. 4–6. Referring specifically to FIG. 4, the fibrous pad 50 is placed in overlying relationship on the mold surface of the lower mold 48. The lower mold, as shown, is provided with apertures 98 extending inwardly of the surface thereof and disposed in communication with a plenum chamber 100 (FIG. 5) connected to a pressurized source of gas, such as pressurized air, through a port 102 connected to the plenum. The upper mold section 46 is provided with suitable heating elements 104, such as electric heating elements or conduits through which a hot liquid such as oil or the like is circulated, to effect a heating of the upper mold section to a desired elevated temperature. The side edges of the lower mold 48 are provided with a V-shaped plate 106, which is adapted to coact with a trim or sealing bar 108 affixed to the periphery of the upper mold 46, which upon a closing of the press effects a sealing of the internal area of the composite fibrous batt.

FIG. 5 illustrates fragmentarily the disposition of the composite fibrous batt between the upper and lower molds upon a closure thereof. The fibrous batt preferably is of a thickness greater than the distance between the mold surfaces such that a partial compaction thereof occurs upon closure of the molds. As will be noted, the lower mold surface can also be provided with a compression bar 110 for compacting both the upper and lower fibrous layers 52, 56 against the upper mold surface for the purpose of forming a densified strip or rib for reinforcing the panel. Upon a closing of the mold to the position shown in FIG. 5, pressurized gas, such as heated air, is introduced into the plenum 100 which passes upwardly through the apertures 98 and through the lower fibrous layer 54 against the film 56, causing a compaction and densification of the upper fibrous layer 52 in shape-conforming relationship against the upper mold surface. This is effected as shown in FIG. 6 without any appreciable compaction of the lower fibrous layer 54. In the specific embodiment illustrated in FIG. 6 in which the fibrous pad had been partially compacted during mold closure, a partial expansion of the lower fibrous layer 54 occurs. The effective pressure applied to the underside of the film 56 can be varied over a broad range consistent with the desired densification of the upper fibrous layer 52. While pressures in excess of about 100 psig can be employed, effective pressures within a range of about 20 up to about 50 psig are suitable for most purposes. The specific pressure employed is also determined in part on the initial density of the upper fibrous layer 52, as well as the form and type, if any, of the texturing on the upper mold surface to be imparted to the outer face of the densified layer. Since the sealing of the peripheral portions of the composite pad 50 between the plate 106 and bar 108 ordinarily is not a perfect seal, pressures slightly in excess of the effective pressure desired are employed.

As shown in FIG. 6, the film 56 acts as a pressure membrane for compacting the upper layer and for allowing expansion of the lower fibrous layer 54 between the film and the lower mold surface. The pressure applied is continued for a period of time to effect a setting of the binding agent in both of the fibrous layers. In accordance with a preferred embodiment, the binding agent employed in both the upper and lower fibrous layers is a thermosetting phenolic type resin, wherein the upper mold surface is heated to a temperature generally ranging from about 350° F. up to about 420° F. to effect a curing thereof. Temperatures about about 450° F. are generally undesirable in that a thermodegradation of certain organic fibers may occur at temperatures of this level, as well as spontaneous combustion of heat sensitive fibrous materials. Ordinarily, dwell periods of from about 10 seconds to about 3 minutes are satifactory for effecting a substantially complete curing of the phenolic binding agent. The curing of the binding agent in the lower fibrous layer 54 can be facilitated by employing heated air introduced through the apertures 98 for pressurizing the mold cavity. At the completion of the molding operation, the pressure is first released whereafter the press is opened and the multiple-density fibrous layered trim panel of a shape-retaining contoured configuration is extracted. Further trimming of the panel can be effected along the edges, as well as for providing suitable apertures in the internal area sections thereof.

Figure 10:
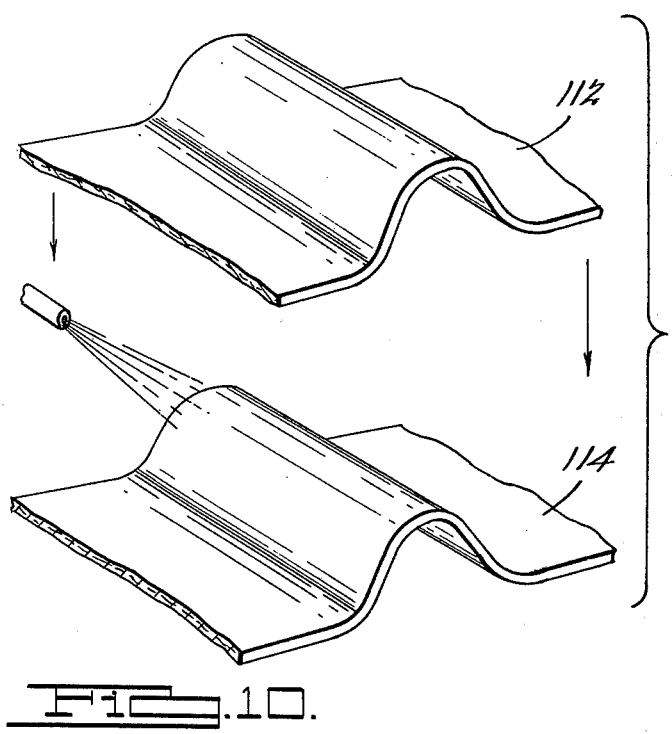
FIG. 10 is a fragmentary perspective view of two independently contoured fibrous layers of controlled different densities which are adhesively secured to form a dual-density fibrous panel.
Figure 11:
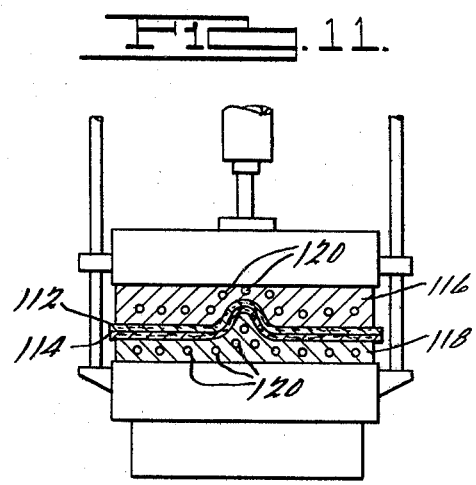
FIG. 11 is a fragmentary side elevational view, partly in section and partly schematic, illustrating a press arrangement for final molding the assembly of FIG. 10.

In addition to the single-stage molding operation as described in connection with FIGS. 4–6, multi-layered acoustical panels of the present invention can also be produced in accordance with the arrangement as illustrated in FIGS. 10 and 11. As shown in FIG. 10, an upper precontoured fibrous layer 112 is applied in superimposed relationship over a lower contoured fibrous layer of lower density and adhesive is applied between the opposed faces thereof. The resultant assembly is placed between upper and lower mated molds 116, 118 of the press shown in FIG. 11, and final molded in a manner to effect simultaneous bonding of the two layers to each other at their interface. The upper contoured layer 112 and lower contoured layer 114 are comprised of the same fiber structure and incorporating binding agents of the types heretofore described in connection with the composite fibrous pad produced in accordance with the procedure of FIGS. 7–9. The upper and lower pads are individually molded employing a similar press arrangement to that shown in FIG. 11 in which a substantially complete setting of the binding agent is effected. A final contouring, sizing and curing or setting of the binding agent is effected during the course of the final molding operation as shown in FIG. 11.

As in the case of the single molding step previously described, the upper fibrous layer 112 is preliminarily formed and molded to a substantially high density approaching 100% theoretical density; while the lowered contoured layer 114 is formed to a relatively lower density, where upon assembly thereof a slight further compaction can be effected to produce the desired final densification and mating. A final setting of the binding agent, such as a thermosetting curable type binding agent, can be effected by providing the upper and lower mold sections 116, 118 with suitable heating elements 120 of the type previously described in connection with FIG. 4, for heating the fibrous layers to a temperature generally from about 350° F. to about 420° F. Alternatively, heated air can be passed through the fibrous layers to effect a curing thereof and to further accelerate the setting of the adhesive layer between opposed face surfaces thereof.

Figure 12:
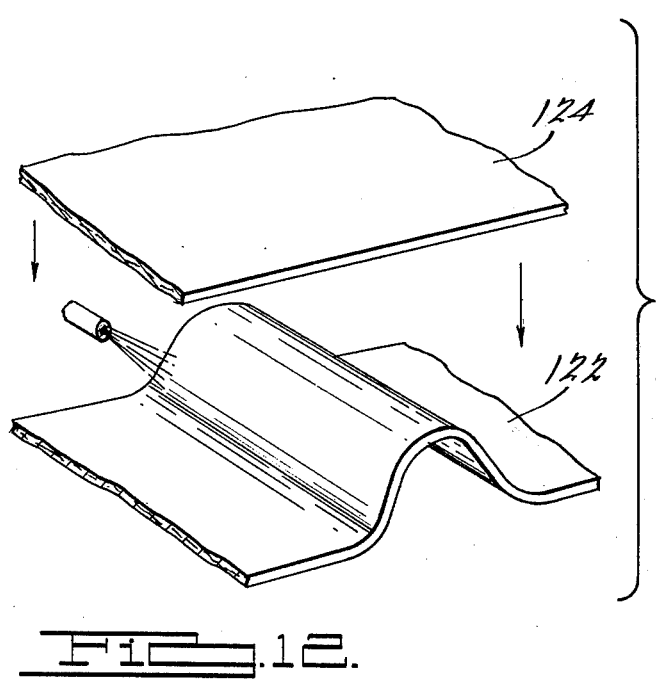
FIG. 12 is a fragmentary perspective view of a low density separately controued fiber layer and a higher density heat softened fibrous layer adapted to be applied in superimposed relationship over the low contoured layer.
Figure 13:
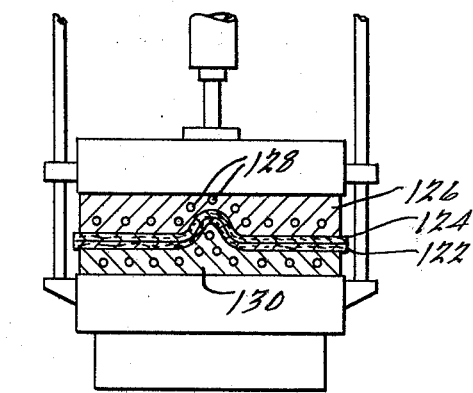
FIG. 13 is a fragmentary side elevational view, partly in section and partly schematic, illustrating a press arrangement for final cold molding the fibrous assembly of FIG. 12.

Another alternative satisfactory process embodiment for producing a multiple-density layered fibrous acoustical panel is illustrated in FIGS. 12 and 13. As shown, a lower preliminarily contoured fibrous layer 122 is provided of a desired relatively low density produced such as in the manner previously described in connection layers 112, 114 of FIG. 10. The upper, more dense fibrous layer 124 is molded to a flat configuration and contains predominantly heat softenable thermoplastic binding agents of the types heretofore described, preferably in further combination with a minor quantity of a thermosetting binding agent present in amounts sufficient to integrally bond the fibrous matrix together and to retain its integrity when the pad is subjected to elevated temperatures to effect a heat softening thereof prior to molding. For this purpose, the thermoplastic binder is preferably employed in amounts of about 50% up to about 80% of the total binder present.

The upper fibrous layer 124 is molded under pressure at an elevated temperature to the desired density and in a manner to effect a substantially complete curing of the thermosetting binding constituent to form an integral pad. While still in a heat softened condition, or alternatively, upon being reheated to a heat softened condition generally in the range of from about 220° F. to about 400° F., and preferably from about 250° F. to about 300° F., the flat upper layer 124 is placed over the preliminarily contoured lower density layer 122 while in the heat softened condition, forming an assembly which is final molded in the press arrangement illustrated in FIG. 13. The opposed faces of the fibrous layers 124 and 122 are preferably provided with a suitable adhesive coating to assure integral bonding therebetween. In accordance with the press arrangement illustrated in FIG. 13, the upper mold 126 is formed with cooling passages 128 through which a suitable cooling fluid, such as a water-glycol mixture, is circulated to cool the upper mold surface to a temperature below that at which a rigidification of the thermoplastic binder in the upper layer 124 is effected. The lower mold 130 is of an appropriate contour and is matched to the contour of the upper mold, whereby the composite acoustical panel is finish-molded to accurate final thickness and density, while simultaneously effecting a setting of the adhesive layer therebetween. After the upper layer 124 has been cooled to a temperature at which the thermoplastic binding agent has sufficiently hardened to retain the shape of the upper mold surface, the molds are opened in accordance with the press arrangement previously described, and the assembly is extracted and subjected to further trimming action as may be necessary or desirable, including the application of suitable apertures, slits, etc., therein.

In accordance with an alternate embodiment of the single stage pneumatic pressure molding process employing the mold arrangement as illustrated in FIGS. 5 and 6, the upper mold section 46 is provided with a plenum chamber 132 which is disposed in communication with ports or apertures 134 which extend to the outer face of the upper mold section. The arrangement of the plenum 132 and apertures 134 is similar to that of the plenum 100 and apertures 98 in the lower mold section 48. The provision of such apertures serve to vent entrapped air in the upper fibrous layer 52 providing for a more uniform densification thereof in response to the pressure applied to the underside of the film 56. It is also contemplated that the plenum 132 can be connected to a source of reduced pressure or vacuum so as to provide for a vacuum assist in combination with the pressure applied to the underside of the film 56 to effect a further densification of the upper fibrous layer. Such a vacuum assist is particularly desirable when the upper mold surface incorporates texturing to be imparted to the outer face of the densified layer.

It is also contemplated that the single stage pneumatic pressure molding step can be performed by the utilization of vacuum applied to the plenum 132 relying on atmospheric pressure entering the plenum 100 and apertures 98 of the lower mold section to effect pressurization at the underside of the film and a compaction of the upper fibrous layer. In such event differential pressures of up to about 12 pounds per square inch can be applied to the film. In either event, the vacuum applied to the upper fibrous layer can be as great as about 3 psi absolute. Vacuums to provide absolute pressures below about 3 psi are generally unattainable due to the leakage of air along the edges of the mold through the densified upper fibrous layer. Usually vacuums to provide an absolute pressure ranging from about 7 up to about 11 psi are suitable for most molding operations.

While it will be apparent that the invention herein described is well calculated to achieve the benefits and advantages set forth above, it will be appreciated the invention is susceptible to modification, variation and change without departing from the spirit thereof.

What is claimed is:

1. The method of making an acoustical and thermal insulating fibrous panel which comprises the steps of forming a composite fibrous pad comprising a first fibrous layer and a second fibrous layer disposed in overlying relationship each of substantially uniform thickness and density incorporating a binding agent distributed therethrough and a flexible impervious film disposed between the opposed faces of said first layer and said second layer, positioning said pad with said first layer disposed in overlying relationship adjacent to a mold having a preselected contour, applying a pneumatic pressure through said second layer against said film of a magnitude sufficient to effect a compaction of said first layer between said film and said mold to a desired density and in shape-conforming contact with said mold without effecting any appreciable densification of said second layer, setting said binding agent to retain the fibrous layers in the preselected contoured configuration and said first layer in the densified condition, and thereafter releasing said pneumatic pressure and extracting the contoured dual-density trim panel from said mold.

2. The method as defined in claim 1, in which said film is coextensive with said first and second layer and is of a thickness ranging from about 0.0005 to about 0.025 inch.

3. The method as defined in claim 2, in which said first and second layer of said composite fibrous pad are of a weight of about 50 to about 500 grams per square foot.

4. The method as defined in claim 1, in which said film is of a thickness of about 0.001 to about 0.005 inch.

5. The method as defined in claim 1, in which said first and second layer of said composite fibrous pad are of a weight of about 100 to about 200 grams per square foot.

6. The method as defined in claim 1, in which said composite fibrous pad is formed to a thickness of about 0.5 to about 5 inches.

7. The method as defined in claim 1, in which said composite fibrous pad is formed to a thickness of about 1.5 to about 3 inches.

8. The method as defined in claim 1, in which said binding agent is present in an amount of about 10% to about 45% by weight of the total weight of each of the layers.

9. The method as defined in claim 1, in which said binding agent is heat-activatable and including the further step of heating said composite pad while in said mold under pneumatic pressure to effect a heat setting of said binding agent.

10. The method as defined in claim 1, in which the step of applying pneumatic pressure against said film is performed to control the pressure on said film within a range of about 20 to about 50 psig.

11. The method as defined in claim 1, including the further step of subjecting said composite fibrous pad to a preliminary cure treatment to partially set said binding agent in the stratum adjacent to the outer faces of the fibrous layers.

12. The method as defined in claim 1, including the further step of applying a porous sheet to at least one exposed face of said composite fibrous pad prior to the molding step.

13. The method as defined in claim 1, in which the step of forming said composite fibrous pad includes the further steps of separately forming said second layer, applying said film over one face of said second layer, and thereafter applying said first fibrous layer over said film.

14. The method as defined in claim 13, in which said first layer is separately formed to the desired thickness and density and thereafter is applied over said film.

15. The method as defined in claim 13, in which said first layer is formed in situ on said film.

16. The method as defined in claim 1, in which the step of forming said composite fibrous pad includes the further steps of forming an integral fibrous web of the desired thickness and density, slitting said web intermediate of the face surfaces thereof into said first layer and said second layer, and interposing said film between the opposed slit faces of said first and second layer.

17. The method as defined in claim 1, including the further step of providing said mold with a preselected textured surface over at least a portion of the surface area thereof to impart a corresponding texture to the exposed face of said first layer.

18. The method as defined in claim 1, including the further step of substantially sealing the peripheral edge of said composite fibrous pad prior to the application of pneumatic pressure thereto.

* * * * *